F. L. CROSS.
GAS ENGINE.
APPLICATION FILED FEB. 24, 1908.
1,046,738.
Patented Dec. 10, 1912.
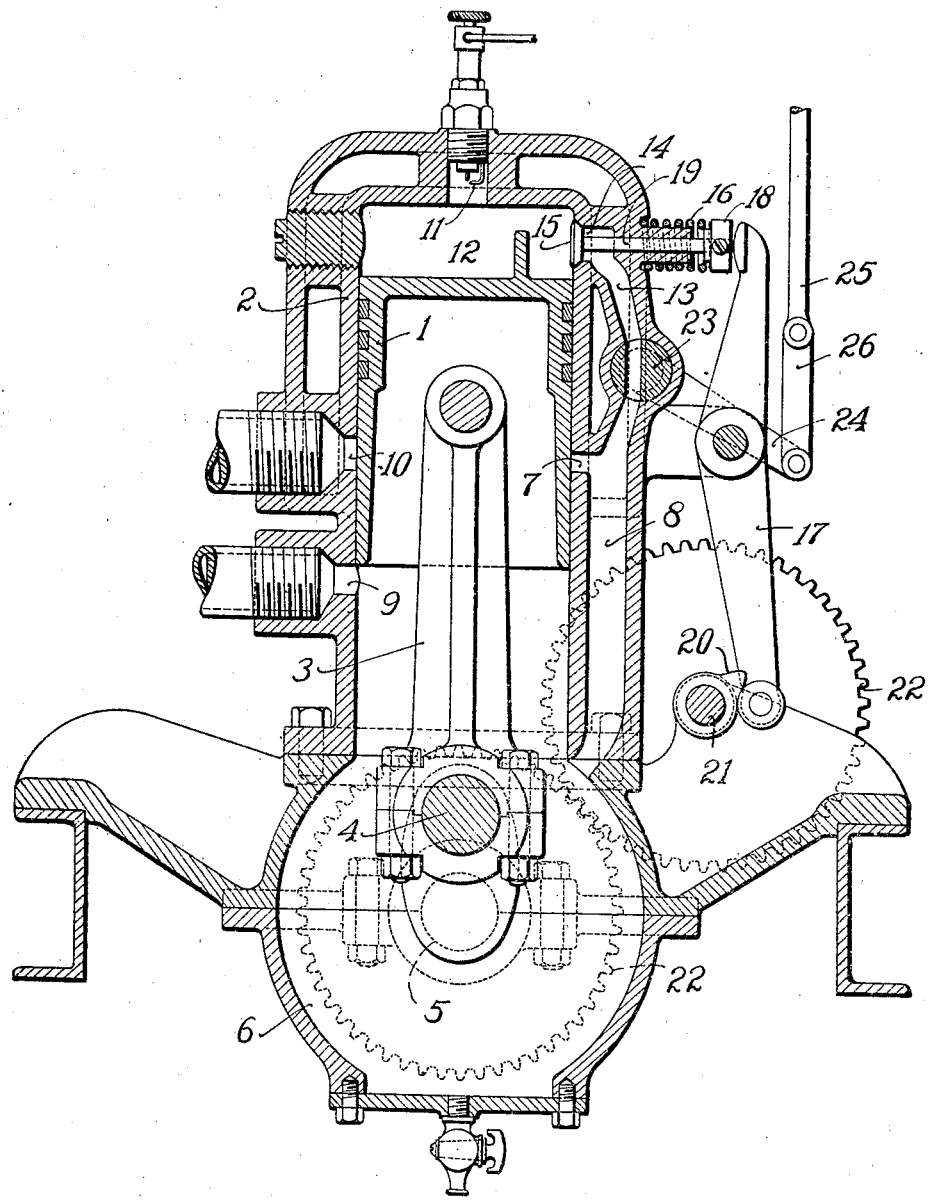
Witnesses:
E. C. Wurdeman
K. D. McPhail
Inventor:
Frank L. Cross
by Phillips Van Everen & Fish
Atty.

UNITED STATES PATENT OFFICE.

FRANK L. CROSS, OF WOLLASTON, MASSACHUSETTS.

GAS-ENGINE.

1,046,738. Specification of Letters Patent. Patented Dec. 10, 1912.

Application filed February 24, 1908. Serial No. 417,282.

*To all whom it may concern:*

Be it known that I, FRANK LEONARD CROSS, citizen of the United States, residing at Wollaston, in the county of Norfolk and State of Massachusetts, have invented certain new and useful Improvements in Gas-Engines; and I do hereby declare the following to be a full, clear, and exact description of the invention, such as will enable others skilled in the art to which it appertains to make and use the same.

The invention relates to that class of gas or explosive engines known as 2-cycle engines, in which a charge of motive fluid is introduced into the cylinder back of the piston at the end of each forward stroke of the piston, is compressed during the return stroke of the piston, and is exploded as the piston reaches the end of its return stroke. In engines of this class as commonly constructed and controlled, the speed of the engine is controlled by throttling the supply of gas either by locating a throttling device between the carbureter and the chamber in which the preliminary compression of the charge is effected, or between this chamber and the supply port through which the charge is delivered to the compression space of the cylinder. In either case the throttling of the supply delivered to the cylinder results in an incomplete discharge of the products of combustion from the cylinder, so that they mingle with the fresh charge supplied to the cylinder and interfere with the proper and efficient operation of the engine. It has been proposed to control the speed of this type of engine by providing a bypass from the upper end of the cylinder to the preliminary compression chamber, and to control the communication between this bypass and the cylinder by means of a valve which is so operated that it will remain open during a part of the compression stroke of the piston, the length of time the valve remains open being varied according to the speed of the engine. This construction is objectionable, if not impracticable, by reason of the fact that these engines run at an extremely high rate of speed, and the time that the valve remains open is therefore so short that it is impracticable to control the time during which it remains open in such manner as to properly and effectively regulate the proportion of the charge which is allowed to escape through the valve.

It is the object of the present invention to overcome the objections to the former regulating devices for this class of engines, and to provide means for controlling the speed of the engine in an efficient and reliable manner while supplying a full charge to the cylinder at each stroke of the piston.

To these ends, one of the principle features of the invention contemplates providing the engine with a port which is open to the compression space in the cylinder during a part of the compression stroke of the piston, and providing means for regulating the escape of the motive fluid through the port during the time that it is open. With this construction a full charge of motive fluid may be supplied to the cylinder at the end of each forward stroke of the piston, and a greater or less proportion of the charge may be allowed to escape through the port, the proportion which escapes being effectively regulated without requiring a change in the time during which the port is open, and in accordance with the speed desired or the load under which the engine is running. The construction and arrangement of the port, and of the means for opening and closing it, and of the means for regulating the escape of the motive fluid while the port is open, are not material to the invention in its broader aspects, and may be varied as found desirable and best suited to the construction or form of the engine in which the invention is embodied.

A further feature of the invention contemplates the provision of a passage leading from the compression space of the cylinder to the preliminary compression chamber, and which is in communication with the compression space of the cylinder during a definite part of the compression stroke of the piston, and the provision of means for throttling the flow of fluid through the passage and thus varying the proportion of the charge retained within the compression space of the cylinder according to the speed at which it is desired that the engine should run, or according to the load under which the engine is working.

A further feature of the invention contemplates controlling the opening and closing of the port in the cylinder by a valve which is open during a fixed part of the compression stroke of the piston, and controlling the flow of fluid through the port by a throttling valve which is arranged in the passage leading from the compression space of the cylinder to the compression chamber. With this construction the valve which opens and closes the port may be accurately timed to open the port during the required proportion of the compression stroke of the piston, and the speed of the engine may be effectively and properly regulated by operating the throttling valve to offer a greater or less resistance to the escape of the charge while the port is open.

The throttling valve or other means for regulating the escape of the charge may be either manually or automatically operated according to the conditions under which the engine is to be run. For instance, in case the engine is to be utilized in driving an automobile or other motor vehicle, the throttling valve or other regulating device may be manually operated to vary the speed of the engine as desired. On the other hand, if the engine is to be utilized where a constant speed is required under varying loads, the throttling valve or other regulating device may be readily operated by any common form of governing device. In any case, a full charge of motive fluid is supplied to the cylinder at the end of each forward stroke of the piston, so that the presence of a proper mixture in the compression space of the cylinder is insured both when running under full load and at full speed and when running under light loads or at slow speeds.

The various features of the invention will be readily understood from an inspection of the accompanying drawing, in which the figure shown is a vertical central section illustrating an engine embodying the various features of the invention in the forms in which I prefer to use them.

In the form of engine shown in the drawing, the piston 1 is mounted in the cylinder 2, and is connected by means of a connecting rod 3 with a crank 4 which is formed on the crank shaft 5. A crank chamber 6 communicates with the lower end of the cylinder, and forms the chamber in which the charge is compressed sufficiently to displace the products of combustion when the supply port 7 is opened by the forward stroke of the piston. The crank chamber communicates with the supply port 7 through a passage 8, and communicates with a carbureter or source of motive fluid through a port 9. The cylinder is provided with an exhaust port 10 and with an ignition device 11.

For the purpose of controlling the speed of the engine while allowing a full charge to be supplied to the compression space 12 of the cylinder under all conditions, a passage or bypass 13 is provided which communicates with the compression space of the cylinder through a port 14, and communicates with the preliminary compression chamber 6 through the passage 8. The communication between the bypass and the compression space of the cylinder is controlled by a valve 15, which is held to its seat by a spring 16, and normally cuts off communication between the compression space of the cylinder and the bypass 13. This valve is open during a fixed proportion of the compression stroke of the piston by means of a lever 17, the upper end of which is arranged to engage a collar 18 secured to the outer end of the valve stem 19, and the lower end of which carries a roll arranged to be engaged by a cam 20. The cam 20 is secured to a shaft 21 which is connected with the crank shaft 5 through gears 22, so that it makes one revolution for each revolution of the crank shaft, and acts to open the valve 15 for a fixed part of the upward stroke of the piston. The flow of motive fluid through the bypass 13 during the time that the valve 15 and port 14 are open is controlled by a throttle valve 23 which may be operated to allow a free flow of the motive fluid through the bypass, or to throttle the flow to any desired extent. This throttling valve is operated through an arm 24 which may be manually operated through a rod 25 and connecting link 26, or may be automatically operated through any suitable governing mechanism.

When running under full load and at full speed, the throttling valve 23 may be in position to close the bypass 13, and in such case the full charge applied to the compression space of the cylinder will be compressed and exploded, and the engine will operate in the same manner that it would if the valve 15, bypass 13, and throttling valve 23, were not present. In case the engine is manually controlled and it is desired to slow down the speed, the rod 25 may be operated to turn the throttle valve 23 into position to partially open the bypass 13. In such case a part of the charge within the compression space 12 will flow through the bypass 13 into the compression chamber 6 during the time that the valve 15 is open, and a smaller charge than normal will be compressed and exploded, thus causing a reduction in the speed of the engine. The proportion of the charge which is thus allowed to escape during the compression stroke of the piston may be conveniently and effectively regulated by varying the position of the throttling valve so that it will throttle the flow of fluid through the bypass to a greater or less extent, and thus the speed of the engine may be effectively and accurately controlled. The throttling valve may be similarly operated to regulate the proportion of the charge which escapes from the cylinder during the compression stroke of the piston in case it is desired to maintain the engine at a constant speed under varying loads, and the valve may be thus operated either manually or automatically.

While I prefer to embody the features of the invention in substantially the form and arrangement indicated in the drawing, it will be understood that the specific construction and arrangement of the parts is not essential to the broader features of the invention. The term "preliminary compression chamber" used in the specification and claims is intended to refer to any chamber or space in which a pressure is either maintained or produced requisite to the proper supply of the motive fluid to the compression space of the cylinder when the supply port is open.

Having explained the nature and object of the invention, and described one form of engine in which the invention may be embodied, what I claim is:—

1. A 2-cycle engine, having, in combination, a cylinder, a piston, means for supplying a full charge of motive fluid to the cylinder at the end of each forward stroke of the piston, a port open to the combustion chamber of the cylinder during a part of the compression stroke of the piston, and means for regulating the escape of motive fluid through the port during the time that it is open independently of the extent to which it is open, substantially as described.

2. A 2-cycle engine, having, in combination, a cylinder, a piston, a preliminary compression chamber, a passage communicating with the combustion chamber of the cylinder and with the compression chamber, means for opening said passage to the combustion chamber of the cylinder during a part of the compression stroke of the piston, and means independent of the last mentioned means for regulating the escape of the motive fluid through said passage while it is in communication with the combustion chamber of the cylinder, substantially as described.

3. A 2-cycle engine, having, in combination, a cylinder, a piston, means for supplying a full charge of motive fluid to the cylinder at each forward stroke of the piston, a port communicating with the combustion chamber of the cylinder, a valve for opening and closing the port, means for opening the valve operating during the compression stroke of the piston, and means for regulating the escape of the motive fluid through the port independently of the extent to which the valve is open, substantially as described.

4. A 2-cycle engine, having, in combination, a cylinder, a piston, a preliminary compression chamber, a bypass leading from the combustion chamber of the cylinder to the preliminary compression chamber, a valve for opening and closing communication between the bypass and cylinder, means for opening said valve to a constant extent during a part of the compression stroke of the piston, and means for varying the back-flow of fluid through said passage, substantially as described.

5. A 2-cycle engine, having, in combination, a cylinder, a piston, a preliminary compression chamber, a bypass leading from the combustion chamber of the cylinder to the preliminary compression chamber, a valve for opening and closing communication between the cylinder and bypass during the compression stroke of the piston, and a throttling valve in the bypass, substantially as described.

6. A 2-cycle engine, having, in combination, a cylinder, a piston, a passage communicating with the combustion chamber of the cylinder, a valve for opening and closing communication between the passage and cylinder during the compression stroke of the piston, and an independent throttling valve in the passage, substantially as described.

7. A 2-cycle engine, having, in combination, a cylinder, a piston, means for supplying a full charge of motive fluid to the cylinder at the end of each forward stroke of the piston, a port communicating with the combustion chamber of the cylinder, a valve for opening said port during the compression stroke of the piston, and an independently operated throttle valve for regulating the escape of motive fluid through the port during the time that it is open, substantially as described.

In testimony whereof I affix my signature, in presence of two witnesses.

FRANK L. CROSS.

Witnesses:
CHARLES W. McDERMOTT,
IRA L. FISH.